Figures 1, 2, 3:
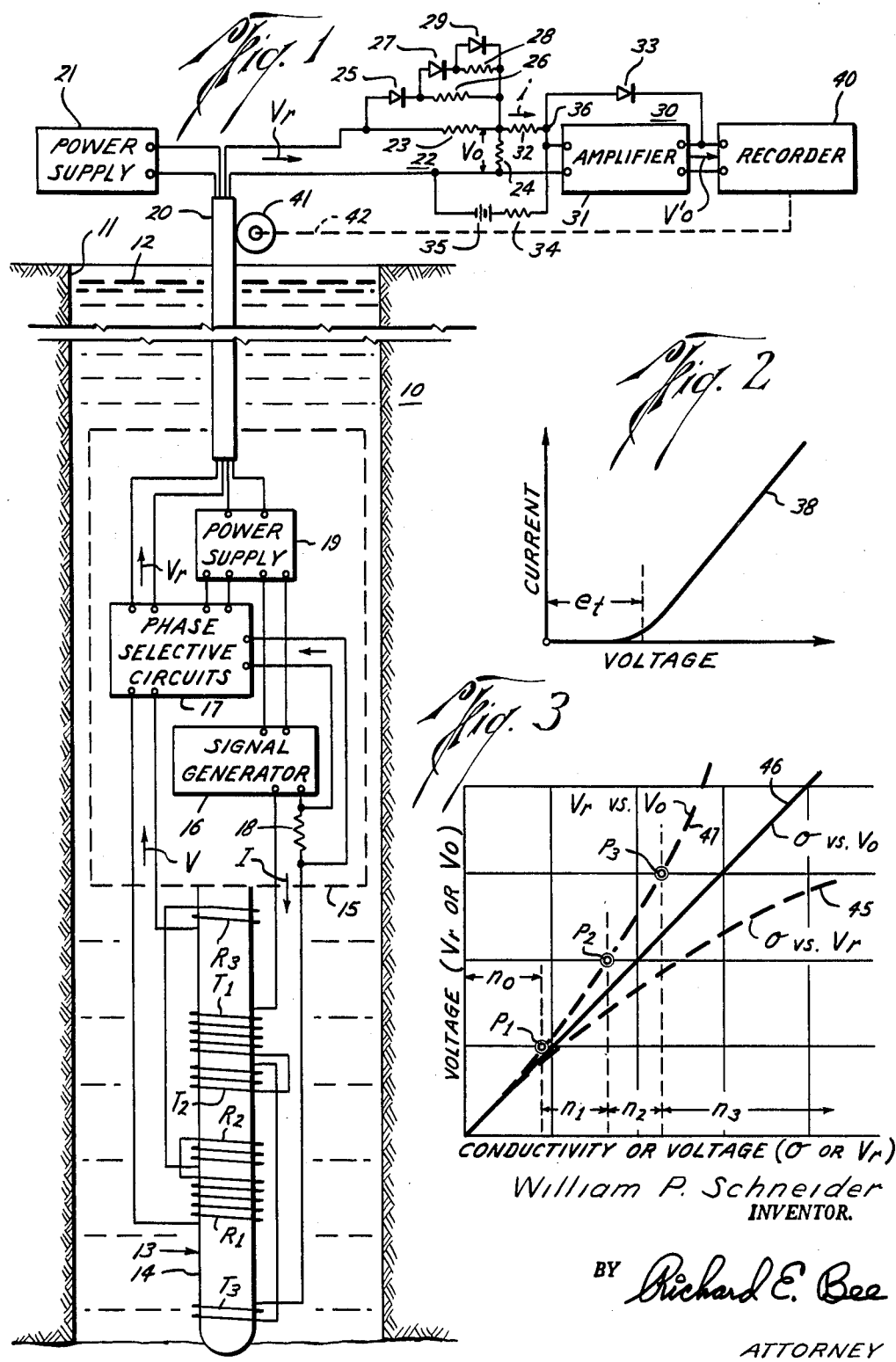

Dec. 1 W. P. SCHNEIDER 3,226,633
INDUCTION LOGGING APPARATUS INCLUDING NON-LINEAR
MEANS FOR TRANSLATING A DETECTED SIGNAL
Filed June 8, 1960

William P. Schneider
INVENTOR.

BY Richard E. Bee
ATTORNEY

United States Patent Office 3,226,633
Patented Dec. 28, 1965

3,226,633
INDUCTION LOGGING APPARATUS INCLUDING NON-LINEAR MEANS FOR TRANSLATING A DETECTED SIGNAL
William P. Schneider, Houston, Tex., assignor to Schlumberger Well Surveying Corporation, Houston, Tex., a corporation of Texas
Filed June 8, 1960, Ser. No. 34,825
13 Claims. (Cl. 324—6)

This invention relates to apparatus for investigating subsurface earth formations traversed by a borehole and, particularly, to electrical logging apparatus for measuring the electrical resistance properties of such subsurface formations.

One manner of measuring the electrical resistance properties of subsurface formation material adjacent a borehole is to move a coil system through the borehole. During such movement, the coil system is energized with alternating current for electromagnetically inducing a flow of electrical current in the adjacent formation material. This formation current flow, commonly referred to as "eddy current," serves to induce measureable signal components back into the coil system. The magnitude of this current flow in the formation material is dependent on the value of the electrical resistance of the formation material. Consequently, there is developed by the coil system measureable signal indications which are representative of such electrical resistance.

In most cases, it is desired that a linear relationship exists between the output signal developed by the logging system and the formation property being measured. In other words, such output signal should be directly and linearly proportional to the formation property being measured. Sometimes, it is instead desired to record the output signal in a known and precise non-linear manner. For example, it is sometimes desired to use a logarithmic scale presentation such that the recorded signal is directly proportional to the logarithmic of the formation property being measured. In any case, a definite and precise relationship of a suitable type must exist between the recorded signal and the formation characteristic being measured.

Under certain circumstances, non-linear effects occur in the measurement of the formation material. This, in turn, introduces non-linear components into the output signal which, unfortunately, are not usually compatible with the desired type of scale presentation for the recorded signal. For example, for the coil or induction logging system described above, the occurrence of electrical skin effect phenomena in the formation material may cause the logging system output signal to vary in a non-linear manner with respect to the electrical conductivity of the formation material. This non-linear relationship is not compatible with either a linear or a logarithmic type of scale presentation or, for that matter, any other type of scale presentation heretofore given any appreciable consideration. Consequently, when such skin effect non-linearity becomes significant, the recorded output signal will not indicate the actual formation conductivity with the required degree of accuracy. Whether such skin effect phenomena will affect the output signal to a significant extent depends on many factors such as the type of coil system being used, the physical construction of the coil system, the operating frequency of the coil system and the conductivity value of the adjacent formation material. It has, however, definitely been found that such undesired non-linear effects occur with otherwise desirable types of coil systems and under formation conditions which occur often enough to make it worthwhile to find some means for compensating for such non-linear effects.

It is an object of the invention, therefore, to provide new and improved borehole investigating apparatus which provides improved indications of the properties of subsurface earth formations adjacent a borehole.

It is another object of the invention to provide new and improved borehole investigating apparatus which compensates for undesired non-linear effects occurring in the fomation material.

It is a further object of the invention to provide new and improved induction logging apparatus which compensates for the occurrence of any electrical skin effect phenomena in the formation material.

In accordance with the invention, induction logging apparatus for investigating earth formations traversed by a borehole comprises a coil system adapted for movement through the borehole and means for energizing the coil system with alternating current to develop a signal which is dependent on the electrical characteristics of the adjacent formation material. Such apparatus also includes means coupled to the coil system for developing a signal representative of a given phase component of the coil system signal. Such apparatus further includes means for increasing the magnitude of the given phase signal as a non-linear function of the magnitude of such given phase signal. The apparatus additionally includes means for providing an indication of the increased magnitude signal.

For a better understanding of the present invention, together with other and further objects thereof, reference is had to the following description taken in connection with the accompanying drawings, the scope of the invention being pointed out in the appended claims.

Referring to the drawings:

FIG. 1 illustrates, in a schematic manner, a representative embodiment of borehole logging apparatus constructed in accordance with the present invention; and FIGS. 2 and 3 are graphs utilized in explaining the operation of the FIG. 1 apparatus.

Referring to FIG. 1 of the drawings, there is shown a representative embodiment of logging apparatus constructed in accordance with the present invention for investigating earth formation 10 traversed by a borehole 11. The borehole 11 is usually filled with a conductive drilling fluid or drilling mud 12. The apparatus of the present embodiment includes a coil system 13 adapted for movement through the borehole 11. This coil system 13 includes three transmitter coils $T_1$, $T_2$ and $T_3$ and three receiver coils $R_1$, $R_2$ and $R_3$. Each of these coils consists of one or more turns of conductive wire wound around an elongated, non-conductive, non-magnetic support member 14. The three transmitter coils $T_1$, $T_2$ and $T_3$ are connected in series with one another to form a set of transmitter coils. The three receiver coils $R_1$, $R_2$ and $R_3$ are also connected in series with one another so as to form a set of receiver coils. At least one coil in each set is connected in a series opposing manner.

Secured to the upper end of the elongated support member 14 is a fluid-tight instrument housing 15. This instrument housing 15 includes means for energizing the transmitter coils $T_1$, $T_2$ and $T_3$ with alternating current to develop in the receiver coils $R_1$, $R_2$ and $R_3$ a signal which is dependent on the electrical conductivity of the adjacent formation material. This energizing means is represented by a signal generator 16. This signal generator 16 serves to develop an alternating current $I$ having a constant amplitude and a constant frequency. This alternating current $I$ is supplied to the transmitter coils $T_1$, $T_2$ and $T_3$ for energizing such coils.

The instrument housing 15 also contains means coupled to the receiver coils $R_1$, $R_2$ and $R_3$ for developing a signal representative of a given phase component of such receiver coil signal. This circuit means is represented by phase selective circuits 17. Also supplied to the phase selective circuits 17 is a phase reference signal developed across a resistor 18 connected in series in the transmitter coil energizing current path. Under the control of this phase reference signal, the phase selective circuits 17 operate to develop an output signal $V_r$ which is proportional to the component of the coil system signal V which is in phase with the transmitter coil energizing current I. Phase selective circuits 17 include a suitable phase sensitive detector circuit so that this in-phase signal $V_r$ is a unidirectional or direct current type of signal.

The instrument housing 15 also includes a downhole power supply 19 for supplying the necessary operating voltages to the other downhole electrical circuits.

The downhole portion of the logging apparatus, which includes the coil system 13 and the instrument housing 15, is suspended from the surface of the earth by way of an armored multiconductor cable 20. A suitable drum and winch mechanism (not shown) is located at the surface of the earth for increasing or decreasing the length of cable 20 suspended in the borehole 11 to provide for movement of the downhole portion of the apparatus through the borehole 11. Also located at the surface of the earth is a power supply 21 for supplying the necessary electrical power to the downhole circuits. This surface power supply 21 is connected to the downhole power supply 19 by way of a pair of the insulated conductors contained within he cable 20.

The logging apparatus also includes means for increasing the magnitude of the $V_r$ given-phase signal as a non-linear function of the magnitude of such $V_r$ given-phase signal. In the present embodiment, this means is located at the surface of the earth and includes diode circuit means 22 having a voltage divider network for translating the $V_r$ given-phase signal and a plurality of diode devices for progressively decreasing the attenuation factor of such network as the $V_r$ given-phase signal increases. More particularly, this diode circuit means 22 includes a voltage divider network having a series input impedance represented by a resistor 23 and a shunt output impedance represented by a resistor 24. This diode circuit means 22 also includes a first signal path connected in parallel with the series input resistor 23 and formed by a series-connected diode 25 and impedance represented by a resistor 26. The diode circuit means 22 further includes a second signal path connected in parallel with the resistor 26 in the first signal path, this second signal path including a series-connected diode 27 and impedance represented by a resistor 28. In addition, the diode circuit means 22 includes a diode 29 connected in parallel with the resistor 28 in the second signal path.

The present embodiment further includes means for providing an indication of the increased magnitude signal $V_o$ appearing across the shunt output resistor 24 of the diode circuit means 22. In the present embodiment, this includes logarithmic means 30 for developing a signal $V'_o$ which is proportional to the logarithm of the resultant $V_o$ signal provided by the diode circuit means 22. This logarithmic means 30 is a modified form of an operational amplifier type of circuit. It includes a high-gain amplifier 31 which is coupled to the diode circuit output resistor 24 by way of an amplifier input resistor 32. Resistor 32 should be enough larger than resistor 24 so as not to unduly load the output of the diode circuit 22. In the present embodiment, amplifier 31 is required to translate direct current type of signals. Consequently, it should be either of the direct coupled type or else of the alternating current coupled type having input and output elements for converting direct-current signals to alternating-current signals and then back to direct-current signals. The logarithmic circuit 30 also includes a feedback path around the amplifier 31, this feedback path being formed by a diode 33. The logarithmic circuit 30 further includes diode biasing means represented by a resistor 34 and a battery 35. Both the feedback diode 33 and the biasing network formed by resistor 34 and battery 35 are connected to a common junction point 36 on the input side of amplifier 31.

Each of the diodes 25, 27, 29 and 33 located in the diode and logarithmic circuits 22 and 30 is preferably of the silicon junction type. A typical voltage-current characteristic for a silicon junction diode is indicated in FIG. 2 of the drawings. Curve 38 of FIG. 2 shows the relationship between the voltage drop across the diode to the current flowing through the diode. It is noted that an initial threshold voltage $e_t$ must be applied across the diode before a substantial forward flow of current is obtained. Where the environment in which the logging apparatus is used is subject to a relatively wide range of temperature variations, then the diodes 25, 27, 29 and 33 may be located in a small heat chamber or oven which is maintained at a constant temperature.

The signal indicating means of the present embodiment also includes linear recorder means represented by a recorder 40 for providing an indication of the $V'_o$ signals appearing at the output of the logarithmic circuit 30. Recorder 40 is of the recording galvanometer type wherein permanent record of the signal values is produced on a suitable recording medium such as photographic film material. In order to provide a record or log of the signal values as a function of the depth of the coil system 13 in the borehole 11, this recording medium or film material is advanced in synchronism with the movement of the downhole apparatus by means of a mechanical measuring wheel 41 which engages the cable 20 and which synchronizes the operation of recorder 40 by way of a suitable mechanical or electromechanical linkage indicated by dash-line 42.

Considering now the operation of the apparatus just described, as the downhole portion of the apparatus including the coil system 13 and instrument housing 15 is moved through the borehole 11, the signal generator 16 operates to energize the transmitter coils $T_1$, $T_2$ and $T_3$ with alternating current. The resulting electromagnetic flux field serves to induce a flow of secondary current in the adjacent formation material. This secondary current flow induces voltage components into the receiver coils $R_1$, $R_2$ and $R_3$. Additional voltage components are induced in the receiver coils because of direct flux linkage between transmitter and receiver coils. There is thus developed across the three series-connected receiver coils $R_1$, $R_2$ and $R_3$ a net alternating voltage V which is described by the following mathematical expression:

$$V = V_r + jV_x \quad (1)$$

$V_r$ denotes the net voltage component which is in phase with the transmitter coil energizing current I. $V_x$, on the other hand, denotes the net voltage component which is 90° out of phase with respect to the phase of the transmitter coil energizing current.

Most of the 90° or quadrature component resulting from direct flux linkage is cancelled by the coil system itself by suitable construction and spacing of the various series-opposing coils. Any remaining quadrature component is eliminated by the phase selective circuits 17. Consequently, there appears at the output of such phase selective circuits 17 a unidirectional signal which is proportional to the net in-phase component $V_r$.

From electromagnetic field theory and, in particular, from the theory concerning magnetic dipoles, it can be shown for the case of a coaxial type of coil system located in a homogeneous, isotropic medium that the net in-phase voltage component $V_r$ is described by the expression:

$$V_r = K_\sigma \left( 1 - \frac{2}{3} \frac{L'}{\delta} + \frac{2}{23} \frac{L'''}{\delta^3} - \cdots \right) \quad (2)$$

$\sigma$ denotes the electrical conductivity of the medium, in this case, the formation material. K denotes a proportionality constant which, among other things, depends on the physical construction of the coil system and is described by the expression:

$$K = \frac{\mu^2 \omega^2 I}{4\pi} \Sigma\left(\frac{A_t A_r}{L}\right) \quad (3)$$

$\mu$ denotes the permeability of the medium. $\omega$ denotes the angular frequency of the transmitter coil energizing current. I denotes the amplitude of the transmitter coil energizing current. $A_t$ denotes the product of cross-sectional area times number of coil turns for a transmitter coil. $A_r$ denotes the product of cross-sectional area times number of coil turns for a receiver coil. L denotes the spacing between coil centers for the transmitter-receiver coil pair being considered. The summation sign indicates that the included term is a summation of these factors for each possible transmitter-receiver coil pair of the system.

The L' factor of Equation (2) represents the mean first power of the effective coil system length and is described by the expression:

$$L' = \frac{\Sigma(A_t A_r)}{\Sigma\left(\frac{A_t A_r}{L}\right)} \quad (4)$$

The L''' factor of Equation (2) denotes the mean third power of the effective coil system length and is described by the expression:

$$L''' = \frac{\Sigma(A_t A_r) L^2}{\Sigma\left(\frac{A_t A_r}{L}\right)} \quad (5)$$

The $\delta$ factor of Equation (2) denotes the electrical skin depth in the medium and is described by the expression:

$$\delta = \sqrt{\frac{2}{\mu \omega \sigma}} \quad (6)$$

This skin depth $\delta$ represents the effective depth of penetration of the electromagnetic field into the adjacent formation material.

A consideration of Equation (2) shows that the net in-phase signal $V_r$ can be considered as being composed of two components described by the expression:

$$V_r = V_g - V_s \quad (7)$$

$V_g$ denotes the linear term in Equation (2) and, hence, is described by the expression:

$$V_g = K\sigma \quad (8)$$

$V_s$, on the other hand, denotes the non-linear terms of Equation (2) and, hence, is described by the expression:

$$V_s = K\sigma\left(\frac{2}{3}\frac{L'}{\delta} - \frac{2}{15}\frac{L'''}{\delta^3} + \cdots\right) \quad (9)$$

These non-linear terms denoted by the symbol $V_s$ are caused by the occurrence of electrical skin effect phenomena in the adjacent formation material. Thus, $V_s$ denotes a skin effect component which, as indicated by Equation (7), acts to detract from the desired linear component $V_g$ in a non-linear manner.

If the effective length of the coil system, namely, L', is less than one-half of the skin depth $\delta$, then Equation (2) may be simplified by omitting the higher order skin effect terms. Thus, under this condition Equation (2) becomes:

$$Vr = K\sigma\left(1 - \frac{2}{3}\frac{L'}{\delta}\right) \quad (10)$$

This can be rewritten as:

$$V_r = K\sigma - K'\sigma^{3/2} \quad (11)$$

where K' is the proportionality constant for the non-linear term. Thus, as before:

$$V_g = K\sigma \quad (12)$$

The skin effect component $V_s$, on the other hand, now becomes:

$$V_s = K'\sigma^{3/2} \quad (13)$$

Thus, in most cases, the skin effect component $V_s$ is proportional to the three-halves power of the formation conductivity.

Referring now to FIG. 3 of the drawings, curve 45 shows in a graphical manner the way in which the in-phase $V_r$ signal varies as a function of the formation conductivity $\sigma$. In this case, the abscissa axis is plotted in terms of conductivity while the ordinate axis is plotted in terms of the voltage $V_r$. Depending on the construction of the particular coil system being considered and also on the range of conductivity values being considered, either the complete expression of Equation (2) or the approximate expression of Equation (10) may be used to obtain a graphical plot of the type represented by curve 45 for any desired type of coil system.

The desired linear relationship between the formation conductivity $\sigma$ and the resulting in-phase $V_r$ signal is indicated graphically by line 46 of FIG. 3. If the coil system proportionality constant K of Equation (12) is assumed to represent the desired overall scale factor for the system, then the straight line 46 of FIG. 3 corresponds to a graphical plot of Equation (12). The difference between this line 46 and curve 45 then represents the undesired signal reduction produced by the occurrence of the electrical skin effect phenomena in the adjacent formation material.

In accordance with the present invention, means are provided for compensating for the undesired reduction in the $V_r$ signal caused by such electrical skin effect phenomena. In the present embodiment, this means takes the form of the diode circuit 22. This diode circuit 22 serves to increase the magnitude of the in-phase $V_r$ signal in a non-linear manner which is the inverse of the manner in which the skin effect phenomena reduces such signal magnitude. More specifically, the diode circuit 22 provides a signal transfer characteristic for the $V_r$ signal as indicated by curve 47 of FIG. 3. For curve 47, the abscissa axis of FIG. 3 is plotted in terms of the voltage $V_r$ supplied to the input of the diode circuit 22 while the ordinate axis is plotted in terms of the output signal voltage $V_o$ obtained across the shunt output resistor 24 of the diode circuit 22. Neglecting scale factors, which may always be adjusted by inserting suitable amplification into the system, the diode circuit signal transfer characteristic represented by curve 47 is the mirror image of curve 45 which represents the relationship between the formation conductivity and the net in-phase $V_r$ component.

Assuming first that the $V_r$ signal supplied to the diode circuit 22 has an initial value of zero, then the three diodes, 25, 27 and 29 remain in a non-conductive condition because of the absence of the necessary threshold bias $e_t$, as indicated in FIG. 2. In this condition, the signal transfer characteristic of the diode circuit 22 is determined by the relative values of the input and shunt resistors 23 and 24. These values are chosen to provide the best straight line approximation to the portion of curve 47 of FIG. 3 lying in the initial interval $n_0$. Assuming that the adjacent formation conductivity is continuously increasing, then the $V_r$ signal supplied to the diode circuit 22 increases until at some specific value thereof the diode 25 in the first signal path around the series input resistor 23 becomes conductive. This corresponds to the point $P_1$ on curve 47. With the diode 25 conductive, the effective series impedance for the voltage divider is determined by the parallel combination of resistors 23 and 26. This value is less than that of the resistor 23 alone. Thus, the signal gain is effectively increased. Resistor 26 is chosen so that the diode circuit 22 now provides the best straight line approximation to the portion of curve 47 lying in the interval $n_1$ of FIG. 3.

As the $V_r$ signal continues to increase, a point is eventually reached where the voltage drop across resistor 26 is sufficient to supply the necessary threshold bias for the second diode 27 located in the second signal path.

This second diode 27 then becomes conductive. This corresponds to the point $P_2$ on curve 47. The effective series input impedance for the voltage divider is now determined by the resistors 23, 26 and 28 in parallel. This provides an additional increase in the signal gain of the diode circuit 22. The value of resistor 28 is chosen to provide the best straight line approximation to the portion of curve 47 lying in the interval $n_2$ of FIG. 3.

As the $V_r$ signal continues to increase, a point is eventually reached where the voltage drop across resistor 28 in the second signal path is of sufficient value to render the third diode 29 conductive. This corresponds to the point $P_3$ on curve 47 of FIG. 3. The diode circuit 22 is now providing its maximum signal gain, which gain is chosen to provide the best straight line approximation to at least the initial portion of the $n_3$ interval of FIG. 3.

The resulting output signal $V_o$ appearing across the shunt output resistor 24 of the diode circuit 22 is linearly proportional to the formation conductivity $\sigma$. In other words, the non-linearity provided by the diode circuit 22 has been made to offset the coil system non-linearity resulting from the electrical skin effect phenomena. This provides an overall relationship which is substantially linear. This linear relationship of the output signal $V_o$ across resistor 24 to the formation conductivity $\sigma$ is indicated by the straight line 46 of FIG. 3.

It is understood that curves 45 and 47 of FIG. 3 are intended only as a typical representation of a specific case. The curvature of these curves may be more pronounced or less pronounced, depending on the specific construction of the particular coil system being considered. If necessary, additional diode controlled signal paths may be used in the diode circuit 22 to provide a greater degree of accuracy or to provide the same degree of accuracy for a coil system having a greater degree of curvature in the non-linear relationship between the formation conductivity and the $V_r$ signal. Also, if the non-linearity is less pronounced or if less accuracy is required, then a smaller number of diodes may be used.

The linear $V_o$ signal developed across the output resistor 24 could, if desired, be supplied directly to the recorder 40 to provide a linear recording of the subsurface conductivity values. In many cases, this would, in fact, be done. It has been found, however, that further advantages can be obtained by converting the linear signal to a logarithmic signal before it is applied to the recorder 40. This makes the recorded log easier to read and to interpret accurately, especially where several different curves are simultaneously recorded on the same portion of the recording medium.

In order to provide such a logarithmic signal, the linear $V_o$ signal appearing across the output resistor 24 is supplied to the logarithmic circuit 30. The primary logarithmic element in this circuit 30 is the diode 33 which, in the present embodiment, is of the silicon junction type. More particularly, the voltage-current relationship for a silicon diode when current is flowing in a forward direction through the diode is described by the mathematical expression:

$$e = k \log i + c \qquad (14)$$

$e$ denotes the voltage drop across the diode, $k$ is a proportionality constant, $i$ is the current flowing through the diode and $c$ is a second proportionality constant. The diode biasing network, which includes the resistor 34 and the battery 35, serves to bias the diode 33 so that it is operating in the forward conduction region even when the linear $V_o$ signal assumes a value of zero.

As is known for the case of an operational amplifier type of circuit, the junction point 36 corresponding to the upper input terminal of amplifier 31 represents a "virtual ground" point. In other words, the voltage difference between the two input terminals of amplifier 31 is maintained at a value of substantially zero by the feedback action provided by the diode 33 feedback path. With the junction point 36 being considered as a "virtual ground," it is seen that the output voltagt $V'_o$ from the amplifier 31 is described by the expression:

$$V'_o = -e \qquad (15)$$

It is also seen that the diode current $i$ is described by the expression:

$$i = \frac{V_o}{R} \qquad (16)$$

where R denotes the value of the input resistor 32 of the logarithmic circuit 30.

Inserting the values of $e$ and $i$ as given by Equations 15 and 16 into Equation 14 gives:

$$V'_o = -k \log \frac{V_o}{R} - c \qquad (17)$$

This may be rewritten as:

$$V'_o = -k \log V_o - c' \qquad (18)$$

where $c'$ denotes the new proportionality constant.

Equation 18 shows the logarithmic output signal $V'_o$ is directly proportional to the logarithm of the linear $V_o$ signal which is supplied to the input of the logarithmic circuit 30. The polarity reversal indicated by the minus sign is of no great concern because the connections to the recorder 40 input terminals are chosen to give the proper polarity of recorder scale deflection. The logarithmic signal $V'_o$ from the logarithmic circuit 30 is thus supplied to recorder 40 to provide the desired logarithmic scale presentation of the subsurface conductivity values.

While there has been described what is at present considered to be a preferred embodiment of this invention, it will be obvious to those skilled in the art that various changes and modifications may be made therein without departing from the invention and it is, therefore, intended to cover all such changes and modifications as fall within the true spirit and scope of the invention.

What is claimed is:

1. In induction logging apparatus for investigating earth formations traversed by a borehole, the combination comprising: a coil system adapted for movement through the borehole; means for energizing the coil system with alternating current to develop an electrical signal which is dependent on the electrical characteristics of the adjacent formation material, such signal including a nonlinear component caused by electrical skin effect phenomena; means coupled to the coil system for detecting the magnitude of a particular phase component of the coil system signal having a predetermined phase relative to the energizing current and developing an electrical output signal proportional to such magnitude; means responsive to the output signal for producing a modified signal having a magnitude which is a nonlinear function of the magnitude of such output signal, such nonlinear function being proportioned to minimize the nonlinear skin effect component; and means for providing an indication of the modified signal.

2. In induction logging apparatus for investigating earth formations traversed by a borehole, the combination comprising: a coil system adapted for movement through the borehole and including at least one transmitter coil and at least one receiver coil; means for energizing the transmitter coil with alternating current to develop in the receiver coil an electrical signal which is dependent on the electrical characteristics of the adjacent formation material, such signal including a nonlinear component caused by electrical skin effect phenomena; means coupled to the receiver coil for detecting the magnitude of a particular phase component of the receiver coil signal having a predetermined phase relative to the transmitter coil energizing current and developing an electrical output signal proportional to such magnitude; means responsive to the output signal for producing a modified signal having a magnitude which is a nonlinear function of the magnitude of such output signal, such nonlinear function being proportioned to minimize the nonlinear skin effect component; and means for providing an indication of the modified signal.

3. An induction logging apparatus for investigating earth formations traversed by a borehole, the combination comprising: a coil system adapted for movement through the borehole; means for energizing the coil system with alternating current to develop an electrical signal which is dependent on the electrical characteristics of the adjacent formation material, such signal including a nonlinear component caused by electrical skin effect phenomena; phase sensitive circuit means coupled to the coil system for detecting the magnitude of a phase component of the coil system signal which is in phase with the energizing current and developing an electrical output signal proportional to such magnitude; means responsive to the output signal for producing a modified signal having a magnitude which is a non-linear function of the magnitude of such output signal, such nonlinear function being proportioned to minimize the nonlinear skin effect component; and means for providing an indication of the modified signal.

4. In induction logging apparatus for investigating earth formations traversed by a borehole, the combination comprising: a coil system adapted for movement through the borehole; means for energizing the coil system with alternating current to develop an electrical signal which is dependent on the electrical conductivity of the adjacent formation material, such signal including a nonlinear component caused by electrical skin effect phenomena; means coupled to the coil system for detecting the magnitude of a particular phase component of the coil system signal having a predetermined phase relative to the energizing current and developing an electrical output signal proportional to such magnitude; means responsive to the output signal for producing a modified signal having a magnitude which is a nonlinear function of the magnitude of such output signal, such nonlinear function being proportioned to minimize the nonlinear skin effect component; and means for providing an indication of the modified signal.

5. In induction logging apparatus for investigating earth formations traversed by a borehole, the combination comprising: a coil system adapted for movement through the borehole; means for energizing the coil system with alternating current to develop an electrical signal which is dependent on the electrical conductivity of the adjacent formation material, such signal including a nonlinear component caused by electrical skin effect phenomena; means coupled to the coil system for detecting the magnitude of a phase component of the coil system signal which is in phase with the energizing current and developing an electrical output signal proportional to such magnitude; means for varying the magnitude of the output signal as a function of the three-halves power of the magnitude of such output signal; and means for providing an indication of the varied magnitude output signal.

6. In induction logging apparatus for investigating earth formations traversed by a borehole, the combination comprising: a coil system adapted for movement through the borehole; means for energizing the coil system with alternating current to develop an electrical signal which is dependent on the electrical conductivity of the adjacent formation material and includes nonlinear components resulting from the occurrence of electrical skin effect phenomena in such formation material; means coupled to the coil system for detecting the magnitude of a phase component of the coil system signal which is in phase with the energizing current and developing an electrical output signal proportional to such magnitude; means for varying the magnitude of the output signal as a nonlinear function of the magnitude of such output signal to provide a resultant signal which is linearly proportional to the formation conductivity; logarithmic means for developing a signal which is proportional to the logarithm of the resultant signal; and means for providing an indication of the logarithmic signal.

7. In induction logging apparatus for investigating earth formations traversed by a borehole, the combination comprising: a coil system adapted for movement through the borehole; means for energizing the coil system with alternating current to develop an electrical signal which is dependent on the electrical characteristics of the adjacent formation material, such signal including a nonlinear component caused by electrical skin effect phenomena; means coupled to the coil system for detecting the magnitude of a particular phase component of the coil system signal having a predetermined phase relative to the energizing current and developing an electrical output signal proportional to such magnitude; nonlinear signal-translating circuit means for translating the output signal and for varying the magnitude of the output signal as a non-linear function of the magnitude of such output signal during such translation, such nonlinear function being proportioned to minimize the nonlinear skin effect component; and linear recorder means for providing an indication of the translated output signal.

8. In induction logging apparatus for investigating earth formations traversed by a borehole, the combination comprising: a coil system adapted for movement through the borehole; means for energizing the coil system with alternating current to develop an electrical signal which is dependent on the electrical characteristics of the adjacent formation material, such signal including a nonlinear component caused by electrical skin effect phenomena; means coupled to the coil system for detecting the magnitude of a particular phase component of the coil system signal having a predetermined phase relative to the energizing current and developing an electrical output signal proportional to such magnitude; nonlinear signal-translating circuit means having a nonlinear input-output signal transfer characteristic and having its input coupled to the output of the detecting means for developing an electrical output signal having a magnitude which is a nonlinear function of the magnitude of the detecting means output signal, such nonlinear signal transfer characteristic being proportioned to minimize the nonlinear skin effect component; and means coupled to the output of the nonlinear circuit means for providing an indication of its output signal.

9. In induction logging apparatus for investigating earth formations traversed by a borehole, the combination comprising: a coil system adapted for movement through the borehole; means for energizing the coil system with alternating current to develop an electrical signal which is dependent on the electrical characteristics of the adjacent formation material; means coupled to the coil system for detecting the magnitude of a particular phase component of the coil system signal having a predetermined phase relative to the energizing current and developing an electrical output signal proportional to such magnitude; diode circuit means for varying the magnitude of the output signal as a non-linear function of such magnitude, this diode circuit means including a divider network for translating the output signal and a plurality of diode devices for progressively decreasing the attenuation factor of such network as the output signal increases; and means for providing an indication of the signal translated by the divider network.

10. In induction logging apparatus for investigating earth formations traversed by a borehole, the combination comprising: a coil system adapted for movement through the borehole; means for energizing the coil system with alternating current to develop an electrical signal which is dependent on the electrical characteristics of the adjacent formation material; means coupled to the coil system for detecting the magnitude of a particular phase component of the coil system signal having a predetermined phase relative to the energizing current and developing an electrical output signal proportional to such magnitude; a divider network for translating the output signal and including a series input impedance and a shunt output impedance; a signal path connected in parallel with the series input impedance and including series-connected diode and impedance elements; and means for providing an indication of the signal appearing across the shunt output impedance.

11. In induction logging apparatus for investigating earth formations traversed by a borehole, the combination comprising: a coil system adapted for movement through the borehole; means for energizing the coil system with alternating current to develop an electrical signal which is dependent on the electrical characteristics of the adjacent formation material; means coupled to the coil system for detecting the magnitude of a particular phase component of the coil system signal having a predetermined phase relative to the energizing current and developing an electrical output signal proportional to such magnitude; a divider network for translating the output signal and including a series input impedance and a shunt output impedance; a first signal path connected in parallel with the series input impedance and including series-connected diode and impedance elements; a second signal path connected in parallel with the impedance element in the first signal path and including series-connected diode and impedance elements; and means for providing an indication of the signal appearing across the shunt output impedance.

12. In induction logging apparatus for investigating earth formations traversed by a borehole, the combination comprising: a coil system adapted for movement through the borehole; means for energizing the coil system with alternating current to develop an electrical signal which is dependent on the electrical characteristics of the adjacent formation material; means coupled to the coil system for detecting the magnitude of a particular phase component of the coil system signal having a predetermined phase relative to the energizing current and developing an electrical output signal proportional to such magnitude; a divider network for translating the output signal and including a series input impedance and a shunt output impedance; a first signal path connected in parallel with the series input impedance and including series-connected diode and impedance elements; a second signal path connected in parallel with the impedance element in the first signal path and including series-connected diode and impedance elements; a diode element connected in parallel with the impedance element in the second signal path; and means for providing an indication of the signal appearing across the shunt output impedance.

13. In induction logging apparatus for investigating earth formations traversed by a borehole, the combination comprising: a coil system adapted for movement through the borehole and including at least one transmitter coil and at least one receiver coil; means for energizing the transmitter coil with alternating current to develop in the receiver coil a signal which is dependent on the electrical conductivity of the adjacent formation material; phase sensitive circuit means coupled to the receiver coil for developing a signal representative of a phase component of the receiver coil signal which is in phase with the transmitter coil energizing current; a divider network for translating the in-phase signal and including a series input resistor and a shunt output resistor; a first signal path connected in parallel with the series input resistor and including a series-connected diode and resistor; a second signal path connected in parallel with the resistor in the first signal path and including a series-connected diode and resistor; a diode connected in parallel with the resistor in the second signal path; and recorder means for providing an indication of the signal appearing across the shunt output resistor.

References Cited by the Examiner

UNITED STATES PATENTS

| 2,220,070 | 11/1940 | Aiken | 324—6 |
| 2,769,137 | 10/1956 | Creusere. | |
| 2,788,483 | 4/1957 | Doll | 324—6 |
| 2,877,348 | 3/1959 | Wade et al. | 330—110 X |
| 2,899,550 | 8/1959 | Meissinger et al. | 235—197 X |
| 2,923,876 | 2/1960 | Daspit | 235—197 X |
| 3,036,265 | 5/1962 | Ghose | 324—6 |

OTHER REFERENCES

De Shang, Jr. "Logarithmic Amplifiers With Fast Response," Electronics, March 1954; pp. 190–191.

WALTER L. CARLSON, *Primary Examiner.*

LLOYD McCOLLUM, FREDERICK M. STRADER,
*Examiners.*